UNITED STATES PATENT OFFICE.

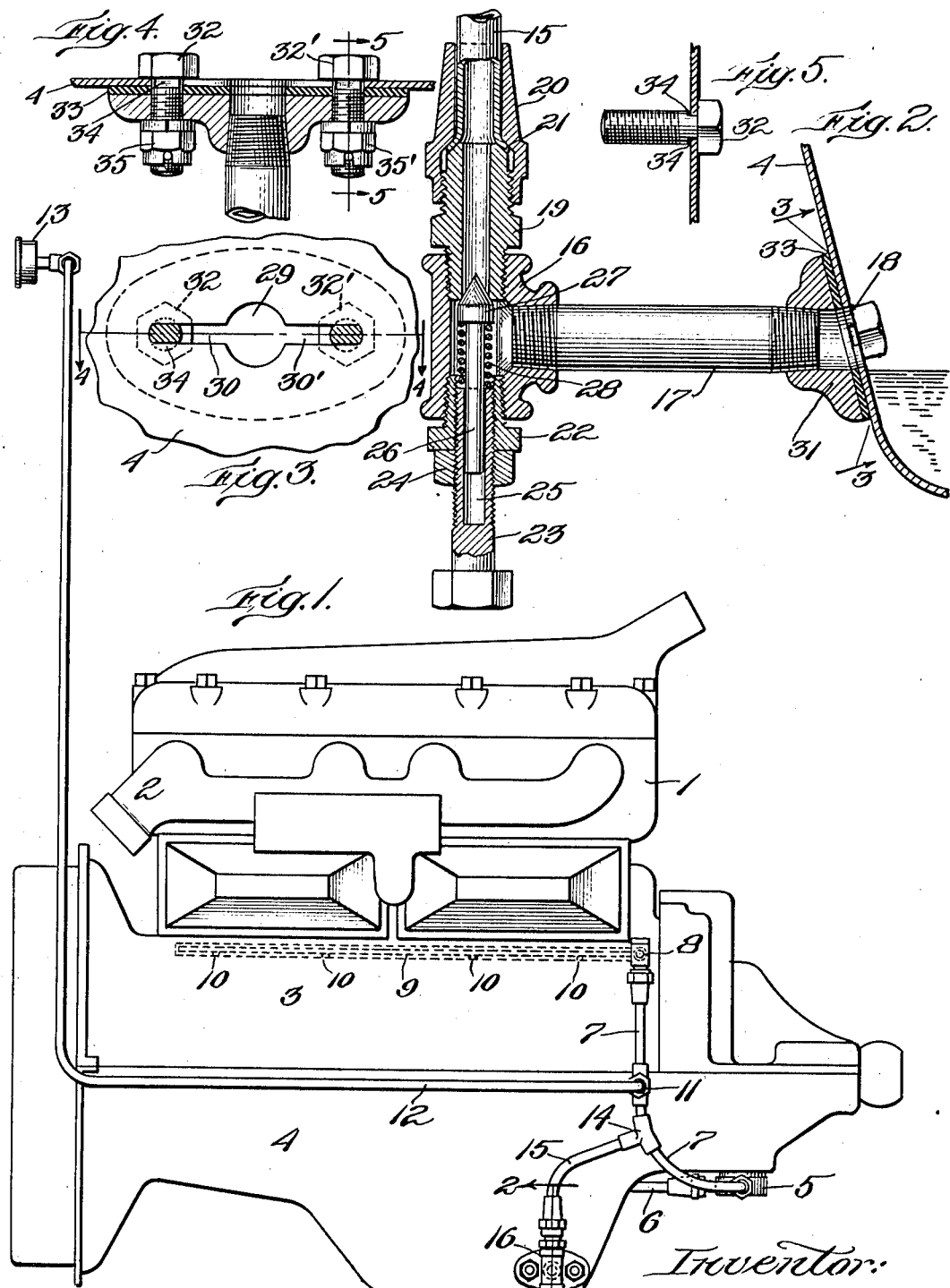

GEORGE LUCAS APPLEYARD, OF LAWRENCE, MASSACHUSETTS.

LUBRICATION SYSTEM FOR INTERNAL-COMBUSTION ENGINES.

1,314,562.   Specification of Letters Patent.   Patented Sept. 2, 1919.

Application filed March 20, 1919. Serial No. 283,764.

*To all whom it may concern:*

Be it known that I, GEORGE L. APPLEYARD, a citizen of the United States of America, and resident of Lawrence, in the county of Essex and State of Massachusetts, have invented new and useful Improvements in Lubrication Systems for Internal-Combustion Engines, of which the following is a specification.

This invention relates to a lubrication system for internal combustion engines and more particularly to lubrication apparatus especially adapted for use on engines of the type used on Dodge Brothers automobiles.

In the lubrication systems commonly employed on automobiles an oil circulating pump is geared to the engine in such manner that it is driven at a rate proportional to the speed of the engine. Thus when the engine is driven at high rates of speed oil is supplied to the working parts of the engine at a high rate. While the working parts of an engine require more lubrication when operating at a high rate of speed than when operating at a low rate of speed, the amount of oil required does not increase in proportion to the increase in the speed of the engine. Consequently when the pump is geared to the engine so that its speed increases in direct proportion to the speed of the engine, oil is supplied to the working parts of the engine either too rapidly at high speeds of the engine or too slowly at low speeds of the engine depending upon the capacity of the pump and circulating system. With the systems commonly employed it is impossible properly to regulate the flow of oil throughout wide ranges of engine speed. The usual practice is to adjust the system so that it supplies enough oil at low speeds and consequently at high speeds oil is supplied at such a rapid rate that a large proportion of the oil is wasted.

The principal object of the invention is to overcome the aforesaid difficulties and to provide a lubrication system which will supply lubrication to the working parts of the engine at a rate which is sufficient thoroughly to lubricate the parts but which is not so excessive as to waste much if any oil. Other objects of the invention are to provide improved means including an automatic regulator for regulating the flow of oil to the engine, and to arrange the regulating means so that it is readily accessible without disassembling any parts of the engine and so that it may be installed on an engine after the parts of the engine have been completely assembled and after the ordinary parts of the lubrication system have been installed.

The invention will be more readily understood by reference to the preferred embodiment thereof illustrated in the accompanying drawings in which—

Figure 1 is a side elevation of an engine with my improved lubrication system installed thereupon;

Fig. 2 is a section on line 2—2 of Fig. 1;

Fig. 3 is a section on line 3—3 of Fig. 2;

Fig. 4 is a section on line 4—4 of Fig. 3; and

Fig. 5 is a section on line 5—5 of Fig. 4.

The engine for which my improved lubrication system is especially adapted comprises a series of cylinders (four as illustrated in the drawings) incased in a water jacket 1 and having an exhaust manifold 2 communicating with each of the cylinders and having a crank-case formed in upper and lower parts 3 and 4. The crank-case 3—4 is tightly closed so that the lower portion of the crank-case may be employed as an oil reservoir.

The lubrication system comprises a rotary pump 5 disposed beneath the forward end of the crank-case and geared to the crank-shaft within the crank-case by means not shown. An oil supply duct 6 leads from a point inside the crank-case beneath the pool of oil in the lower part thereof outwardly through the crank-case to the pump 5. An oil delivery duct 7 leads from the pump laterally to one side of the crank-case and thence upwardly along the side of the crank-case to a point 8 where it enters the crank-case and connects with an oil distributing duct 9 having openings 10 for feeding the oil to the working parts of the engine. Leading from a point 11 intermediate the ends of the oil delivery duct 7 is a pressure gage duct 12 leading to a pressure gage 13 which is preferably mounted on the instrument board of the automobile.

Leading from the oil delivery duct 7 at a point 14 intermediate the pump 5 and the connection 11 is a by-pass 15 leading rearwardly and downwardly to the regulator 16. Leading from the inner side of the regulator 16 is a duct 17 (Fig. 2) which communicates with the interior of the portion 4 of the crank-case through an opening 18 in the side thereof, preferably at a point above the level of the pool of oil in the crank-case as illustrated in Fig. 2. The regulator and its associated connection comprises a double nipple 19 threaded into the upper end of the T-fitting 16 and into the lower end of a sleeve 20, the nipple 19 and the sleeve 20 being provided with tapered shoulders adapted to grip the lower end 21 of the duct 15 therebetween. Threaded into the lower end of the T-fitting 16 is a nipple 22 and into this nipple is threaded a screw 23, a lock-nut 24 being provided to hold the screw 23 in adjusted position in the nipple 22. The screw 23 is provided with an axial opening 25 into which extends the lower end of the stem 26 of the conical valve 27, the valve 27 being adapted to seat upwardly against the lower end of the nipple 19. A compression spring 28 is provided around the stem 26 of the valve 27, the spring engaging the end of the screw 23 at its lower end and engaging the lower face of the valve head 27 at its upper end. Thus the valve 27 is normally urged upwardly against the lower end of the nipple 19 by the compression spring 28 and the force with which the valve is thus urged upwardly may be varied by adjusting the screw 23 longitudinally in the nipple 22.

The connection between the duct 17 and the crank-case 4 is preferably constructed as follows: A circular opening 29 is drilled in the crank-case in alinement with the duct 17 and leading laterally from the circular opening in opposite directions two slots 30 and 30′ are cut through the crank-case. A flanged connector 31 is secured to the outer side of the crank-case over the openings 29, 30, 30′ by means of bolts 32 and 32′ extending through the slots 30 and 30′ in the crank-case and thence through openings in the flange of the connector 31, a layer of packing material 33 being provided between the connector 31 and the crank-case and having a circular opening in alinement with the opening 29. The heads of the bolts 32 and 32′ are made sufficiently small to be inserted through the opening 29 in the crank-case and the stems of these bolts are slotted as shown at 34 so that the portions of the bolts adjacent the heads will be flattened as shown in Figs. 3 and 5 to such an extent as just to fit into the slots 30 and 30′ in the crank-case.

In securing the connector 31 to the crank-case the head of one of the bolts 32 is inserted through the opening 29 and the flattened portion of the bolt is then moved laterally into one of the slots 30. The other bolt is then inserted through the opening 29 and the flattened portion thereof is moved laterally into position in the other slot 30′. The layer of packing 33 is then placed over the projecting ends of the bolts and the connector 31 is next placed over the ends of the bolts. The nuts 35 and 35′ are then threaded on the ends of the bolts so as firmly to clamp the connector 31 against the outside of the crank-case.

By virtue of the unique connector 31 and associate parts the duct 17 may be connected to a thin pressed-metal crank-case without taking the crank-case apart. By making an opening in the crank-case of the novel form illustrated in Fig. 3 and by forming the bolts as described the bolts may not only be placed in position from the outside of the crank-case but they are prevented both from turning and from being forced into the crank-case by means of the slots 34 adapted to fit into the slots 30 and 30′.

The operation of my improved system is as follows: The regulator is adjusted so that the valve 27 will open when the pressure of the oil in the system exceeds a certain value. Thus when the engine is running and the pump 5 is pumping, all of the oil passing through the pump 5 will be supplied to the distributing pipe 10 until the pump attains such speed as to produce a greater pressure in the stem than the pressure to which the regulator is set. The regulator will then open and permit part of the oil to be shunted from the duct 7 back to the crank-case through the by-pass 15, thereby preventing the amount of oil supplied to the distributing pipe 10 from becoming excessive. If the speed of the pump is still further increased the regulator will open still farther and shunt a larger proportion of the oil back to the crank-case. In this way the system automatically prevents an excessive amount of oil being supplied to the working parts of the engine at high speeds.

A cardinal feature of the invention consists in the inter-relationship of the various ducts and connections whereby the by-pass 15 and the regulator may be disposed wholly outside the crank-case in a position where the regulator can be readily adjusted without disassembling any of the parts of the engine. Another important feature of the invention consists in the means for connecting the by-pass to the crank-case after the crank-case has been completely assembled. This makes it possible to install my improved lubricating apparatus on an engine which has been completely assembled and installed in an automobile. Another important feature of the invention consists in the relationship of the parts whereby the gage 13 always registers the pressure of the oil at which it is supplied to the working parts of the engine.

What I claim is:

1. In an internal combustion engine having a crank-case adapted to contain oil, the combination of a lubricating system comprising an oil duct leading from a point in the crank-case beneath the level of the oil outwardly through the wall of the crank-case and thence upwardly along the side of the crank-case in close proximity to the crank-case and thence inwardly to oil delivery points within the engine, a pump in said oil duct, a by-pass branching off from said oil supply duct on said side of the crank-case and leading along said side of the crank-case to an opening therein, and a pressure relief valve in said by-pass to permit a part of the oil to be shunted back to the crank-case, all of said ducts extending along the same side of the crank-case in close proximity thereto, whereby the lubricating system may be readily installed on an automobile and may be readily adjusted.

2. In an internal combustion engine having a crank-case adapted to contain oil, the combination of a lubricating system comprising a pump disposed beneath the crank-case, an oil supply duct leading from a point in the crank-case beneath the level of the oil to said pump, an oil delivery duct extending from said pump outwardly to one side of the crank-case in close proximity to the crank-case and thence upwardly along the same side, a by-pass branching from said delivery duct approximately parallel to said side of the crank-case and thence leading back into the crank-case, and a pressure relief valve in said by-pass to permit oil to be shunted back to the crank-case.

3. In an internal combustion engine having a sheet metal crank case adapted to contain oil, the combination of a lubricating system comprising an oil duct leading from a point in the crank-case beneath the level of the oil outwardly through the wall of the crank-case and thence upwardly along the side of the crank-case in close proximity to the crank-case and thence inwardly to oil delivery points within the engine, a pump in said oil duct, a by-pass branching off from said oil supply duct on said side of the crank-case and thence leading along said side of the crank-case to an opening therein, a pressure relief valve in said by-pass, and means for bolting said by-pass to said opening in the crank-case from the outside without threading into the sheet metal crank-case, whereby the lubricating system may be installed after the engine has been completely assembled and installed without access to the interior of the crank-case.

4. In an internal combustion engine having a sheet metal crank-case adapted to contain oil, the combination of a lubricating system comprising a pump disposed in a recess beneath the forward end of said crank-case, an oil supply duct leading from a point in the crank-case beneath the level of the oil forwardly through the rear wall of said recess to the said pump, an oil delivery duct leading laterally from one side of said pump and thence curving upwardly and rearwardly along the side of the said crank-case, a by-pass leading rearwardly and downwardly from said curved delivery duct substantially parallel to said side of the crank-case and thence turning inwardly to an opening in the crank-case, a pressure relief valve disposed at the turn in said by-pass, and means for bolting said by-pass to said opening in the crank-case from the outside without threading into the sheet metal crank-case.

5. In an internal combustion engine having a crank-case adapted to contain lubricating oil, the combination of a pump disposed outside the crank-case, an oil supply duct leading from a point in the crank-case beneath the level of the oil to said pump, an oil delivery duct leading from the pump to oil delivery points in the engine, a pressure gage, a gage duct leading from said delivery duct to said pressure gage, a by-pass duct leading from a point in said delivery duct between the pump and said gage duct to an opening in the crank-case, and a pressure regulator in said by-pass adapted to permit oil to be shunted through said by-pass back to the crank-case in sufficient amount to prevent the pressure of the oil supplied to said engine and gage from rising beyond a predetermined value, said regulator being disposed outside the crank-case where it is readily accessible for adjustment.

Signed by me at Lawrence, Massachusetts, this 15th day of March, 1919.

GEORGE LUCAS APPLEYARD.